(12) United States Patent
Merton

(10) Patent No.: US 6,979,501 B2
(45) Date of Patent: Dec. 27, 2005

(54) MAGNETIC RECORDING MEDIUM HAVING A SMOOTH BIAXIALLY TENSILIZED FILM SUBSTRATE

(75) Inventor: Christopher A. Merton, Hammond, WI (US)

(73) Assignee: Imation Corp., Oakdale, MN (US)

(*) Notice: Subject to any disclaimer, the term of this patent is extended or adjusted under 35 U.S.C. 154(b) by 0 days.

(21) Appl. No.: 10/822,885

(22) Filed: Apr. 13, 2004

(65) Prior Publication Data

US 2005/0227124 A1 Oct. 13, 2005

(51) Int. Cl.$^7$ .............................................. G11B 5/73
(52) U.S. Cl. ...................................... 428/844; 428/847
(58) Field of Search ............................. 428/336, 480, 428/694 SL, 844, 847

(56) References Cited

U.S. PATENT DOCUMENTS 4,420,532 A * 12/1983 Yamaguchi et al. ........ 428/329

FOREIGN PATENT DOCUMENTS

EP 1044788 * 10/2000

OTHER PUBLICATIONS

"Magnetic Tape Storage Roadmap," National Storage Industry Consortium, Feb. 2002, p. 55.
"Mechanics and Reliability of Flexible Magnetic Media," Second Edition, Bharat Bhushan, pp. 89-91.

* cited by examiner

Primary Examiner—Stevan A. Resan
(74) Attorney, Agent, or Firm—Eric D. Levinson

(57) ABSTRACT

A magnetic recording medium which includes a non-magnetic substrate having a front side and a backside, a longitudinal direction and a crossweb direction, with a particulate/binder magnetic layer formed over the front side of the substrate, wherein the magnetic medium has a cross web dimensional difference from the magnetic recording head used therewith of less than 900 microns/meter over a 35 degree temperature range, and over a 70% relative humidity range. In one embodiment, the substrate is a polymeric film which has been subjected to a biaxial tensilization process, thus having a lower coefficient of hygroscopic expansion and coefficient of thermal expansion than an otherwise identical film substrate which has not been biaxially tensilized. The magnetic recording medium formed using such a tensilized substrate has a Wyko Ra smoothness of less than about 10 nm, and a coefficient of thermal expansion from about 5 ppm/C to about 10 ppm/C.

10 Claims, 1 Drawing Sheet

MAGNETIC RECORDING MEDIUM HAVING A SMOOTH BIAXIALLY TENSILIZED FILM SUBSTRATE

THE FIELD OF THE INVENTION

The present invention relates generally to magnetic recording media such as a magnetic tape having a Wyko Ra smoothness of less than 10 nanometers (nm), more specifically to a biaxially tensilized substrate for such a recording medium.

BACKGROUND OF THE INVENTION

Magnetic recording media are widely used in audio tapes, video tapes, computer tapes, disks and the like. Magnetic media may use thin metal layers as the recording layers, or may comprise coatings containing magnetic particles as the recording layer. The latter type of recording media employs particulate materials such as ferromagnetic iron oxides, chromium oxides, ferromagnetic alloy powders and the like dispersed in binders and coated on a substrate. In general terms, magnetic recording media generally comprise a magnetic layer coated onto at least one side of a non-magnetic substrate (e.g., a film for magnetic recording tape applications).

In certain designs, the magnetic coating (or "front coating") is formed as a single layer directly onto a non-magnetic substrate. In an alternative approach, the front coating is a dual-layer construction, including a support layer on the substrate and a thin magnetic layer (or "upper layer") formed directly on the support or lower layer. With this construction, the lower layer is thicker than the magnetic layer. The support layer is typically non-magnetic and generally comprised of a non-magnetic powder dispersed in a binder. Conversely, the upper layer comprises a magnetic metal particle powder or pigment dispersed in a binder system. The formulation for the magnetic layer is optimized to maximize the performance of the magnetic recording medium in such areas as signal-to-noise ratios, pulsewidth, and the like.

Magnetic tapes may also have a backside coating applied to the opposing side of the non-magnetic substrate in order to improve the durability, electrical conductivity, and tracking characteristics of the media. As with the front coatings, the backside coatings are typically combined with a suitable solvent to create a homogeneous mixture which is then coated onto the substrate, after which the coating is dried, calendered if desired, and then cured. The formulation for the backside coating or layer also comprises pigments and a binder system.

The magnetic recording medium is formed on a non-magnetic substrate. Exemplary substrate materials useful for magnetic recording tapes include polyesters such as polyethylene terephthalate (PET), polyethylene naphthalate (PEN), a mixture of polyethylene terephthalate and polyethylene naphthalate; polyolefins (e.g., polypropylene); cellulose derivatives; polyamides; and polyimides. The substrate is generally tensilized in the downweb direction for linear recording systems and generally tensilized in the crossweb direction for helical systems. However, such tensilizations causes alignment of the polymeric chains in the direction of tensilization, which, in the case of a down web tensilized film, can adversely affect crossweb thermal expansion and hygroscopic expansion of the film and the magnetic recording medium formed on the film. This in turn has an adverse effect on the dimensional stability of the magnetic recording medium and the track density.

It would be desirable to have a biaxially tensilized substrate that would maximize the dimensional stability of the magnetic recording medium formed thereon. It would be beneficial for the final magnetic recording medium product to exhibit low hygroscopic expansion and low thermal expansion in order to improve the track density and minimize any overwriting of data. However, changes in the substrate can require changes in the coating thickness as well, which requires additional research and development.

It has now been discovered that a magnetic recording medium which includes a non-magnetic substrate having a front side and a backside, a longitudinal direction and a crossweb direction, with a particulate/binder magnetic layer formed over the front side of the substrate, wherein the magnetic medium has a cross web dimensional difference from the magnetic recording head used therewith of less than 900 microns/meter over a temperature range of about 35 degrees, and over a 70% relative humidity range will provide superior smoothness and recording performance.

It has further been discovered that a magnetic recording medium using a substrate that comprises a biaxially tensilized substrate such as a polyethylene naphthalate, rather than a machine direction semi-tensilized polyethylene naphthalate, will provide additional dimensional stability without requiring changes in the substrate or coating thicknesses when the substrate is tensilized such that the thermal expansion of the tape is approximately equal to the thermal expansion of the magnetic recording head.

SUMMARY OF THE INVENTION

The invention provides a magnetic recording medium which includes a non-magnetic substrate having a front side and a backside, a longitudinal direction and a crossweb direction, with a particulate/binder magnetic layer formed over the front side of the substrate, wherein the magnetic medium has a cross web dimensional difference from the magnetic recording head used therewith of less than 900 microns/meter over a 35 degree temperature range, and over a 70% relative humidity range.

In one embodiment, the invention provides a magnetic recording medium including a non-magnetic substrate, which has been biaxially tensilized such that the thermal expansion of the composite tape is equal to or nearly equal to the thermal expansion of the magnetic recording head. The coefficient of thermal expansion of the most commonly used magnetic recording heads is about 7 ppm/C.

Specifically, one embodiment of the invention provides a magnetic recording medium including a non-magnetic substrate which has been biaxially tensilized such that the coefficient of thermal expansion of the composite tape is from about 5 to about 10 ppm/C.

The substrate has a magnetic coating coated onto the front side, and a backside coating on the opposing side of the substrate. The magnetic layer contains one or more metallic particulate pigments, and a binder system therefor. Optionally, there may also be a support layer or sublayer which is coated directly onto the substrate and, in such cases, the magnetic recording layer is coated atop the sublayer. An optional back coating may be formed on the opposing surface of the substrate, comprising carbon black dispersed in a binder.

One magnetic recording medium of the invention comprises a non-magnetic substrate having a front side and a backside, a magnetic layer formed over the front side of the substrate comprising magnetic pigment particles, and a binder system therefor; wherein the substrate is selected from polyesters such as polyethylene terephthalate (PET), polyethylene naphthalate (PEN), a mixture of polyethylene terephthalate and polyethylene naphthalate; polyolefins (e.g., polypropylene); cellulose derivatives; polyamides; and polyimides.

In another embodiment, a magnetic recording medium of the invention comprises a non-magnetic substrate having a front side and a backside, a magnetic layer formed over the front side of the substrate comprising magnetic pigment particles, and a binder system therefor; the substrate being a biaxially tensilized substrate selected from the group consisting of polyethylene naphthalate and polyethylene terephthalate, commonly called PEN and PET. Magnetic recording media of the invention may be single layer media or dual-layer media. Dual-layer media further comprise a support layer or sub-layer coated on the front side of the substrate prior to, or simultaneously with the coating of the magnetic layer.

In another embodiment, the substrate is a biaxially tensilized polyethylene naphthalate.

In yet another embodiment, the substrate is a biaxially tensilized polyethylene terephthalate.

These terms when used herein have the following meanings.

1. The term "coating composition" means a composition suitable for coating onto a substrate.

2. The terms "layer" and "coating" are used interchangeably to refer to a coated composition.

3. The term "biaxially tensilized" means having been subjected to tensilization in both the machine direction and the crossweb direction.

4. The terms "back coating" and "backside coating" are synonymous and refer to a coating on the opposing side of the substrate from a magnetic layer.

5. The term "vinyl" when applied to a polymeric material means that the material comprises repeating units derived from vinyl monomers. When applied to a monomeric material, the term "vinyl" means that the monomer contains a moiety having a free-radically polymerizable carbon—carbon double bond.

6. The term "resistivity" means the surface electrical resistance measured in Ohms/square.

7. The term "Tg" means glass transition temperature.

8. The term "coercivity" means the intensity of the magnetic field needed to reduce the magnetization of a ferromagnetic material to zero after it has reached saturation, taken at a saturation field strength of 10,000 Oersteds.

9. The term "Oersted", abbreviated as Oe, refers to a unit of magnetic field in a dielectric material equal to $1/\mu$ Gauss, where $\mu$ is the magnetic permeability.

10. The term "tape" is used synonymously with the term "magnetic recording medium" and means a substrate coated with at least a magnetic coating on the front side of the substrate.

All weights, amounts and ratios herein are by weight, unless otherwise specifically noted.

DETAILED DESCRIPTION OF THE PREFERRED EMBODIMENTS

Figure 1:
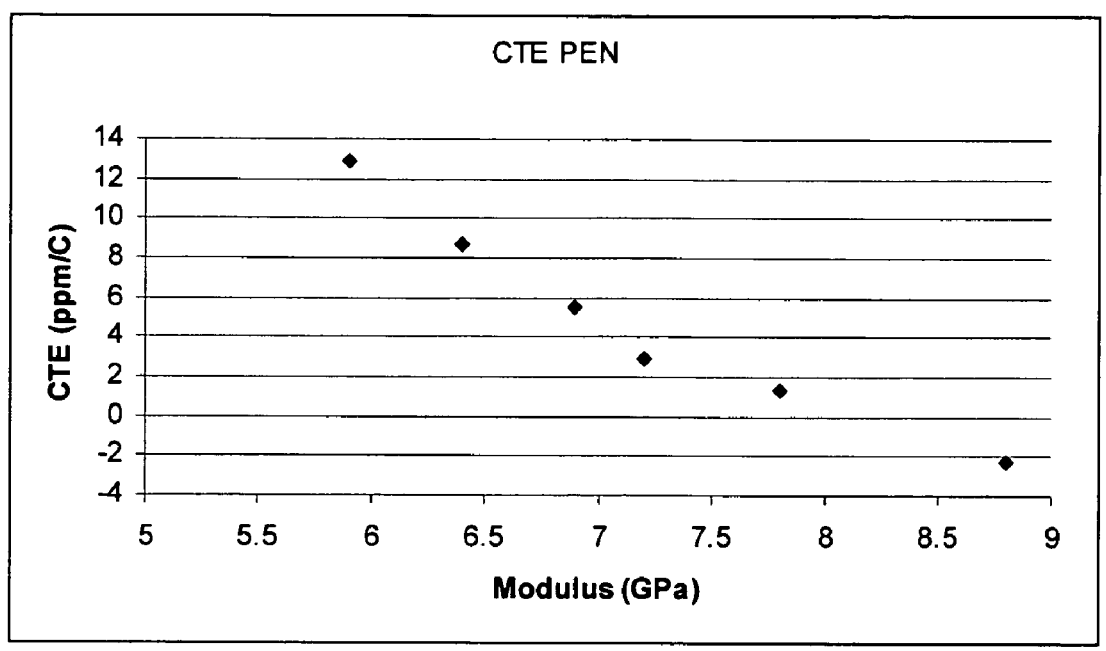
FIG. 1 is a graph showing the thermal expansion of PEN as a function of the modulus.

The following detailed description describes certain embodiments and is not to be taken in a limiting sense. The scope of the present invention is defined by the appended claims.

The magnetic recording medium includes a non-magnetic substrate, a magnetic layer, and, optionally, a sublayer and a backside layer. The various components are described in greater detail below. In general terms, however, the magnetic upper layer includes a primary magnetic metal pigment, and a binder for the pigment. The substrate has high dimensional stability related to the recording head. Useful polymer substrates are tensilized in such a fashion that the resulting tape has a coefficient of thermal expansion from about 5 ppm/C to about 10 ppm/C and a Wyko Ra smoothness of less than 10 nm.

In one embodiment, the magnetic recording medium may be a dual-layer magnetic recording medium having a support layer coated on the front side of the substrate, with the magnetic layer being coated atop the support layer.

Substrate

Magnetic recording media of the invention for use with a magnetic recording head comprise a substrate having a magnetic layer formed over the front side of said substrate, which comprises magnetic pigment particles, and a binder system therefor; wherein the magnetic recording medium has a cross web dimensional difference from the magnetic recording head of less than 900 microns/meter over a 35 degree temperature range, and over a 70% relative humidity range, e.g., from 10% to 70% relative humidity.

In one embodiment, magnetic recording media of the invention comprise biaxially tensilized substrate films. The biaxially tensilized substrate can be formed from any non-magnetic substrate useful as a magnetic recording medium support. Exemplary substrate materials useful for magnetic recording tapes include polyesters such as polyethylene terephthalate (PET), polyethylene naphthalate (PEN), a mixture of polyethylene terephthalate and polyethylene naphthalate; polyolefins (e.g., polypropylene); cellulose derivatives; polyamides; and polyimides. In a preferred embodiment, polyethylene naphthalate (PEN) is employed. The chosen film should be biaxially tensilized to such an extent that the resulting composite magnetic tape has a thermal expansion similar or equal to the thermal expansion of the magnetic head, generally from about 5 ppm/C to about 10 ppm/C. Most magnetic recording heads are manufactured on $Al_2O_3$—TiC wafers, which have a thermal expansion of 7 ppm/C. The thermal expansion of the tape is closely modeled or described by the so-called rule of mixture for laminar composites. The modulus (E), thickness (t) and thermal expansion (CTE) of the combined coatings and substrate can be used to calculate the thermal expansion of the composite.

$$CTE_{tape} = (E_{substrate} * t_{substrate} * CTE_{substrate} + E_{coatings} * t_{coatings} * CTE_{coatings})/(E_{tape} * t_{tape})$$

The selection of the tensilization is based on the property that the thermal expansion coefficient of the substrate is a function of the modulus. As an example, the graph below shows the thermal expansion of PEN as a function of the modulus.

Tensilization of films for use as substrates has traditionally been done in the downweb, or machine direction, in order to improve the ability of the film to handle the accelerations and decelerations of linear tape drives in the industry. However, because of recent decreases in substrate thickness and increases in track density and the like, dimensional stability of the tape has become an issue. The dimensional stability of the tape substrate is a function of the modulus and the expansion coefficient both of the film and of the coatings thereon.

The use of a biaxially tensilized substrate decreases the coefficient of thermal expansion of the film, decreases the coefficient of hygroscopic expansion of the film, and increases the crossweb modulus. These benefits will also be seen in the composite magnetic recording medium.

Further, previous tapes formed using biaxially oriented substrates were rough, having Wyko Ra roughness of more than 10 nm. Such a rough tape will not exhibit all of the benefits of the smoother biaxially oriented substrate, such as high linear density.

Film production typically involves melt extrusion of the polymer at temperatures exceeding 250° C. through a die, rapid quench to reduce temperature, subsequent heating and stretching of the film, followed by heat setting or stabilization. The film is preheated and then passed through two sets of nip rolls, which operate at different speeds to stretch the film longitudinally. During this operation, the film is oriented uniaxially. The film is then stretched in the crossweb direction. To achieve such crossweb stretching, the outer edges are held in a tenter frame with gripping devices. The web width is increased; the gripping devices are moved further apart. The film is transported through the heating zone as the width increases, thus stretching the film in the crossweb direction by about 325% or more.

The Magnetic Recording Layer

In accordance with the current invention, the magnetic recording layer is a thin layer, being preferably from about 1 micro-inch (0.025$\mu$) to about 10 micro-inches (0.25$\mu$) in thickness, preferably from about 1 micro-inch to about 8 micro-inches.

The magnetic metal particle pigments have a composition including, but not limited to, metallic iron and/or alloys of iron with cobalt and/or nickel, and magnetic or non-magnetic oxides of iron, other elements, or mixtures thereof. Alternatively, the magnetic particles can be composed of hexagonal ferrites such as barium ferrites. In order to improve the required characteristics, the preferred magnetic powder may contain various additives, such as semi-metal or non-metal elements and their salts or oxides such as Al, Nd, Si, Co, Y, Ca, Mg, Mn, Na, etc. The selected magnetic powder may be treated with various auxiliary agents before it is dispersed in the binder system, resulting in the primary magnetic metal particle pigment. Preferred pigments have an average particle length no greater than about 75 nanometers (nm). Such pigments are readily commercially available from companies such as Toda Kogyo, Kanto Denka Kogyo, and Dowa Mining Company.

In addition to the preferred primary magnetic metal particle pigment described above, the magnetic layer further includes soft spherical particles. Most commonly these particles are comprised of carbon black. A small amount, preferably less than about 3%, of at least one large particle carbon material may also be included, preferably a material that includes spherical carbon particles. The large particle carbon materials have a particle size on the order of from about 50 to about 500 nm, more preferably from about 70 to about 300 nm. Spherical large carbon particle materials are known and commercially available, and in commercial form can include various additives such as sulfur to improve performance. The remainder of the carbon particles present in the upper layer are small carbon particles, i.e., the particles have a particle size on the order of less than 100 mm, preferably less than about 50 nm.

The magnetic layer also includes an abrasive or head cleaning agent (HCA) component. One preferred HCA component is aluminum oxide. Other abrasive grains such as silica, $ZrO_2$, $Cr_2O_3$, etc., can also be employed, either alone or in mixtures with aluminum oxide or each other.

The binder system associated with the magnetic layer preferably incorporates at least one binder resin, such as a thermoplastic resin, in conjunction with other resin components such as binders and surfactants used to disperse the HCA, a surfactant (or wetting agent), and one or more hardeners. In one preferred embodiment, the binder system of the magnetic layer includes at least one hard resin component and at least one soft resin component in conjunction with the other binder components. Hard resin components typically have a glass transition temperature (Tg) of at least about 70° C., and soft resin components typically have a glass transition temperature of less than about 68° C.

In one embodiment, the magnetic layer comprises a binder system comprising a polyurethane resin and a non-halogenated vinyl resin. Examples of polyurethanes include polyether-polyurethane, polyester-polyurethane, polycarbonate-polyurethane, polyester-polycarbonate-polyurethane, and polycaprolactone-polyurethane. Non-halogenated vinyl resins comprised of styrene and acrylonitrile monomers can also be employed with the primary polyurethane binder, if desired.

In one preferred embodiment, the primary polyurethane binder is incorporated into the magnetic layer in an amount of from about 2 to about 10 parts by weight, and preferably from about 4 to about 8 parts by weight, based on 100 parts by weight of the primary upper layer pigment, and the non-halogenated vinyl binder is incorporated in an amount of from about 7 to about 15 parts by weight, and preferably from about 8 to about 10 parts by weight, based on 100 parts by weight of the primary magnetic layer pigment.

The binder system further preferably includes an HCA binder used to disperse the selected HCA material, such as a polyurethane paste binder (in conjunction with a pre-dispersed or paste HCA). Alternatively, other HCA binders compatible with the selected HCA format (e.g., powder HCA) are acceptable. As with other ingredients, HCA may be added to the main dispersion separately or dispersed in the binder system, and then added to the main dispersion.

The magnetic layer may further contain one or more lubricants such as a fatty acid and/or a fatty acid ester. The incorporated lubricant(s) exist throughout the front coating and, importantly, at the surface thereof the magnetic layer. The lubricant(s) reduces friction to maintain smooth contact with low drag, and protects the media surface from wear. In dual-layer media, lubricant(s) are generally provided in both the upper and lower layers, and are preferably selected and formulated in combination.

Preferred fatty acid lubricants include at least 90 percent pure stearic acid. Although technical grade acids and/or acid esters can also be employed for the lubricant component, incorporation of high purity lubricant materials ensures robust performance of the resultant medium. Other acceptable fatty acids include one or more of myristic acid, palmitic acid, oleic acid, etc., and their mixtures. The magnetic layer formulation can further include one or more fatty acid esters such as butyl stearate, isopropyl stearate, butyl oleate, butyl palmitate, butyl myristate, hexadecyl stearate, and oleyl oleate.

In a preferred embodiment, the lubricant is incorporated into the magnetic layer in an amount of from about 1 to about 10 parts by weight, and preferably from about 1 to about 5 parts by weight, based on 100 parts by weight of the primary pigment.

The binder system may also contain a conventional surfactant or wetting agent. Known surfactants, e.g., adducts of sulfuric, sulfonic, phosphoric, phosphonic, and carboxylic acids, are acceptable.

The coating composition may also contain a hardening agent such as isocyanate or polyisocyanate. In a preferred embodiment, the hardener component is incorporated into the upper layer in an amount of from about 1 to about 5 parts by weight, and preferably from about 1 to about 3 parts by weight, based on 100 parts by weight of the primary magnetic pigment.

The materials for the magnetic layer are mixed with the primary pigment and coated atop the lower layer. Useful solvents associated with the upper layer coating material preferably include cyclohexanone (CHO), with a preferred concentration of from about 5% to about 50%, methyl ethyl ketone (MEK), preferably having a concentration of from about 40% to about 90%, and toluene (Tol), of concentrations from about 0% to about 40%. Alternatively, other ratios can be employed, or even other solvents or solvent combinations including, for example, xylene, methyl isobutyl ketone, tetrahydrofuran, and methyl amyl ketone, are acceptable.

The Optional Sub-Layer

The optional support layer of a dual-layer magnetic tape of the invention is essentially non-magnetic and includes non-magnetic powders and a resin binder system. By forming one or more essentially non-magnetic lower layer, the electromagnetic characteristics of the magnetic layer are not adversely affected.

An optional lower layer of magnetic recording media of the invention includes at least a primary pigment and a binder system therefore. Such support layers are used in combination with an upper magnetic layer to form a magnetic recording medium having high quality recording characteristics and good mechanical and handling properties. The binder system in support layers of dual-layer magnetic media of the invention has a lower Tg than the binder system utilized by the magnetic upper layer.

The primary lower layer pigment material consists primarily of non-magnetic particles, such as iron oxides, titanium dioxide, alumina, tin oxide, titanium carbide, silicon carbide, silicon dioxide, silicon nitride, boron nitride, and the like.

In a preferred embodiment, the primary lower layer pigment material is a hematite material ($\alpha$-iron oxide), which can be acidic or basic in nature. In one embodiment, alpha-iron oxides are substantially uniform in particle size and annealed to reduce the number of pores. After annealing, the pigment is ready for surface treatment, which is typically performed prior to mixing with other layer materials such as carbon black and the like. Alpha-iron oxides are well known and are commercially available from Dowa Mining Company, Toda Kogyo, Sakai Chemical Industry Co, and others.

Conductive carbon black material provides a certain level of conductivity so as to provide the formulation with protection from charging with static electricity. The conductive carbon black material is preferably of a conventional type and widely commercially available. In one preferred embodiment, the conductive carbon black material has an average particle size of less than 20 nm, more preferably about 15 nm.

The support or lower layer may also include an alumina containing pigment. In one embodiment, such pigment is an aluminum oxide pigment. Other abrasive grains such as silica, $ZrO_2$, $Cr_2O_3$, etc., can also be employed, either alone or in mixtures with aluminum oxide. Such pigments are frequently referred to as head cleaning agents (HCA) due to the abrasive nature of the pigments.

The binder system or resin associated with the lower layer preferably incorporates at least one binder resin, such as a thermoplastic resin, in conjunction with other components. Additional components may include binders and surfactants used to disperse the HCA, a surfactant (or wetting agent), and one or more hardeners. The binder system of the lower layer has a lower Tg than the binder system utilized in the magnetic upper layer; useful Tg ranges for lower layers may vary with the desired magnetic layer formulation, but are generally less than about 72° C. Magnetic recording media formed using binder systems of the invention having such lower Tg values will have edges which show a substantial reduction in cracking when compared to dual-layer magnetic recording media using the same binder systems in both the magnetic upper layer and the lower support layer. In fact, at least one preferred embodiment of magnetic recording media of the invention shows substantially no cracking on the edges.

In one embodiment, the binder systems of the support layer contain a hard resin along with a soft resin. The soft resin has a Tg of less than about 60° C., preferably less than about 50° C. The hard resin has a Tg of at least about 72° C., preferably at least about 80° C.

The coating composition further may include an additional binder used as a dispersant, such as a polyurethane paste binder.

The binder system may also contain a conventional surfactant or wetting agent. Known surfactants, e.g., adducts of sulfuric, sulfonic, phosphoric, phosphonic, and carboxylic acids, are acceptable.

The binder system may also contain a hardening agent such as isocyanate or polyisocyanate. In a preferred embodiment, the hardener component is incorporated into the lower layer in an amount of 2 to 5 parts by weight, and preferably 3 to 4 parts by weight, based on 100 parts by weight of the primary lower layer pigment.

The support layer may further contain one or more lubricants such as a fatty acid and/or a fatty acid ester. As with the magnetic layer, the support layer includes stearic acid which is at least about 90% pure. Other acceptable fatty acids include myristic acid, palmitic acid, oleic acid, etc., and their mixtures. The support layer formulation can further include a fatty acid ester such as butyl stearate, isopropyl stearate, butyl oleate, butyl palmitate, butyl myristate, hexadecyl stearate, and oleyl oleate. The fatty acids and fatty acid esters may be employed singly or in combination. The lubricant is typically incorporated into the lower layer in an amount of from about 1 to about 10 parts by weight, and preferably from about 1 to about 5 parts by weight, based on 100 parts by weight based on the primary lower layer pigment combination.

The materials for the lower layer are mixed with the primary pigment and the lower layer is coated to the substrate. Useful solvents associated with the lower layer coating material preferably include cyclohexanone (CHO), with a preferred concentration of from about 5% to about 50%, methyl ethyl ketone (MEK), preferably having a concentration of from about 40% to about 90%, and toluene (Tol), of concentrations from 0% to about 40%. Alternatively, other ratios can be employed, or even other solvents or solvent combinations including, for example, xylene, methyl isobutyl ketone, tetrahydrofuran, and methyl amyl ketone, are acceptable.

The Back Coat

The back coat primarily consists of a soft non-magnetic particle material such as carbon black or silicon dioxide particles. In one embodiment, the back coat layer comprises a combination of two kinds of carbon blacks, including a primary, small carbon black component and a secondary, large texture carbon black component, in combination with appropriate binder resins. The primary, small carbon black component preferably has an average particle size on the order of from about 10 to about 50 nm, whereas the secondary, large carbon component preferably has an average particle size on the order of from about 50 to about 300 nm. The back coat of the magnetic recording medium of the present invention contains from about 25 to about 50 percent small particle carbon particles based on total composition weight, preferably from about 35 to about 50 percent based on total composition weight.

Back coat pigments are dispersed as inks with appropriate binders, surfactant, ancillary particles, and solvents. Preferably, the back coat binder includes at least one of a polyurethane resin, a phenoxy resin, and nitrocellulose blended appropriately to modify coating stiffness as desired.

Useful solvents to create dispersions of the invention include methyl ethyl ketone, toluene, and cyclohexanone, and mixtures thereof, as well as other solvents or solvent combinations including, for example, xylene, methyl isobutyl ketone, and methyl amyl ketone, are acceptable.

Process for Manufacture

The coating materials of the upper layer, lower layer, and back coat according to the present invention are prepared by dispersing the corresponding powders or pigments and the binders in a solvent. For example, with respect to the coating material for the upper layer, the primary metal particle powder or pigment and the large particle carbon materials are placed in a high solids mixing device along with certain of the resins (i.e., polyurethane binder, non-halogenated vinyl binder, and surfactant) and the solvent and processed for from about 1 to about 4 hours. The resulting material is processed in a high-speed impeller dissolver for about 30 to about 90 minutes, along with additional amounts of the solvent. Following this letdown processing, the resulting composition is subjected to a sandmilling or polishing operation. Subsequently, the HCA and related binder components are added, and the composition left standing for about 30 to about 90 minutes. Following this letdown procedure, the composition is processed through a filtration operation, and then stored in a mixing tank at which the hardener component and lubricants are added. The resulting upper layer coating material is then ready for coating.

Preparation of a support layer coating material, when such a layer is used, entails a similar process, including high solids mixing of the pigment combination including the primary lower layer pigment, conductive carbon black material, and HCA with the binder and a solvent, for about 2 to 4 hours.

Finally, preparation of the back coat coating material preferably entails mixing the various components, including a solvent, in a planetary mixer or similar device, and then subjecting the dispersion to a sandmilling operation. Subsequently, the material is processed through a filtration operation in which the material is passed through a number of filters.

The process for manufacture of the magnetic recording medium may include an in-line portion and one or more off-line portions. The in-line portion includes unwinding a non-magnetic substrate or other material from a spool or supply. The substrate is coated with the backcoating on one side of the substrate, next the backside coating is dried, typically using conventional ovens. A front coating is applied to the substrate; for the dual-layer magnetic recording media of the invention, the sub-layer or support layer is applied first, directly onto the substrate, and the magnetic coating is then coated atop the support layer. For single layer magnetic recording media, the magnetic layer is coated directly atop the substrate. Alternatively, the front coating can occur prior to the backcoating. The coated substrate is magnetically oriented and dried, and then proceeds to the in-line calendaring station. According to one embodiment, called compliant-on-steel (COS), in-line calendering uses one or more in-line nip stations, in each of which a steel or other generally non-compliant roll contacts or otherwise is applied to the magnetically coated side of the substrate, and a rubberized or other generally compliant roll contacts or otherwise is applied to the backcoated side. The generally non-compliant roll provides a desired degree of smoothness to the magnetically coated side of the substrate. Alternately, the in-line calendering is "steel-on-steel" (SOS), meaning both opposing rolls are steel. The process may also employ one or more nip stations each having generally non-compliant rolls. After in-line calendaring, the substrate or other material is wound. The process then proceeds to an off-line portion which occurs at a dedicated stand-alone machine. The coated substrate is unwound and then is calendered. The off-line calendering includes passing the coated substrate through a series of generally non-compliant rollers, e.g., multiple steel rollers, although materials other than steel may be used. The coated, calendered substrate then is wound a second time. The wound roll is then slit, burnished, tested for defects according to methods known in the industry.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

EXAMPLE 1

The table below shows an example of changing the substrate used in a magnetic recording medium, Ultrium® Generation 1, commercially available from Imation Corp., from a tensilized polyethylene naphthalate to a polyethylene naphthalate film having been biaxially tensilized (or balanced) while holding the substrate thickness, the coating formulations and the coating thicknesses steady. It is clear from this data that the thermal and hygroscopic expansion coefficients decrease when there is an increase in the cross web modulus of the substrate.

| Tape type | | Gen 1 | Gen 1 | Gen 1 |
|---|---|---|---|---|
| Substrate type | | PEN | PEN | PEN |
| Tensilization | | MD tensilized | Semi-MD tensilized | Biaxially tensilized (balanced) |
| thickness substrate | microns | 6.0 | 6.0 | 6.0 |
| MD modulus substrate | GPa | 8.8 | 7.8 | 6.9 |
| TD modulus substrate | GPa | 5.9 | 6.4 | 7.2 |
| TD thermal substrate | ppm/C | 12.9 | 8.7 | 2.9 |
| TD hygroscopic substrate | ppm/% RH | 12.6 | 10.6 | 8.7 |
| thickness tape | microns | 8.9 | 8.9 | 8.9 |
| TD thermal tape | ppm/C | 14.0 | 12.0 | 7.2 |
| TD thermal relative head | ppm/C | 7.0 | 5.0 | 0.2 |
| TD hygroscopic tape | ppm/% RH | 8.9 | 8.6 | 6.8 |

What is claimed is:

1. A magnetic recording medium comprising a biaxially tensilized substrate having a front side and a backside, a longitudinal direction and a crossweb direction, said substrate having a magnetic layer formed over said front side of said substrate comprising magnetic pigment particles, and a binder system therefor; said magnetic recording medium having a cross web dimensional difference from a substrate wafer of an $Al_2O_3$—TiC bi-phase ceramic formed from aluminum oxide and titanium carbide of less than 900 microns/meter over a temperature range of about 35 degrees, and over a relative humidity range of about 70%, and a coefficient of thermal expansion having a value said magnetic recording medium having a coefficient of thermal expansion of from about 5 ppm/C to about 10 ppm/C, said coefficient of thermal expansion being from about 50% to about 150% of the coefficient of thermal expansion for the substrate wafer.

2. A magnetic recording medium according to claim 1 having a Wyko surface roughness of less than 10 nm.

3. A magnetic recording medium according to claim 1 wherein said magnetic recording medium is used with a magnetic recording head formed on a substrate wafer of an $Al_2O_3$—TiC bi-phase ceramic formed from aluminum oxide and titanium carbide.

4. A magnetic recording medium according to claim 1 wherein said biaxially tensilized substrate is selected from the group consisting of polyesters, polyolefins, cellulose derivatives, polyamides, and polyimides.

5. A magnetic recording medium according to claim 1 wherein said biaxially tensilized substrate comprises a substrate subjected to film tensilization, said substrate being selected from the group consisting of polyethylene naphthalate and polyethylene terephthalate.

6. A magnetic recording medium according to claim 1 wherein said substrate has a thickness of from about 1 to about 10 microns.

7. A magnetic recording medium according to claim 1 wherein the magnetic recording medium has a crossweb modulus of at least about 7 GPa.

8. A magnetic recording medium according to claim 1 wherein the magnetic recording medium has a hygroscopic expansion coefficient of less than about 7 ppm/% RH.

9. A magnetic recording medium according to claim 1 wherein the magnetic layer comprises a ferromagnetic pigment aluminum oxide, a spherical large particle carbon material having a particle size of from about 50 to about 500 nm, a polyurethane binder, a non-halogenated vinyl binder, a hardener, a fatty acid ester lubricant, and a fatty acid lubricant.

10. A magnetic recording medium according to claim 1 wherein the magnetic layer comprises a ferromagnetic pigment, aluminum oxide, a spherical large particle carbon material having a particle size of from about 50 to about 500 nm, a polyurethane binder, a polyvinylchloride binder, a hardener, a fatty acid ester lubricant, and a fatty acid lubricant.

* * * * *